Aug. 5, 1958   R. L. CARLSTEDT   2,845,823
SUPPLY DEVICE FOR COOLING AGENT IN BORING MACHINES
Filed Oct. 12, 1954
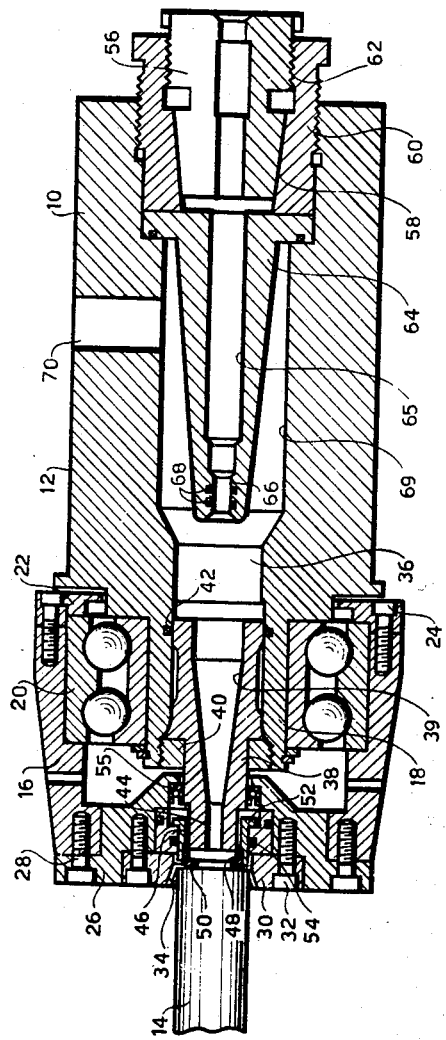

2,845,823

SUPPLY DEVICE FOR COOLING AGENT IN BORING MACHINES

Ragnar Leonard Carlstedt, Hagersten, Sweden, assignor to DHB Corp., New York, N. Y., a corporation of New York Application October 12, 1954, Serial No. 461,887

Claims priority, application Sweden October 15, 1953

4 Claims. (Cl. 77—55)

My invention relates to a device for supply of cooling agent to the boring tool acting on the workpiece in a boring machine.

My invention more particularly relates to a supply device of the type set forth provided with a longitudinally extending channel which is passed by the boring tool and into which opens a supply conduit for the cooling agent at a right angle relatively to the longitudinal direction of said channel.

My invention is primarily concerned with boring tools of the type comprising a head with cutting edges and a shank, both said head and said shank formed with an inner, axially extending bore. In the workpiece the cutting head cuts out a bore having a larger diameter than that of the shank so as to allow the cooling agent, such as oil, to be fed into the bore around the boring tool and then to escape together with the bore chips cut off through the interior bore of the tool.

I have developed boring machines and cutting tools permitting a feeding speed at least three or four times higher than the optimum values obtained hitherto. This feature results, inter alia, in high demands on the supply of the cooling oil. As a consequence the pressure with which the liquid is introduced into the device had to be raised to 60 kg./cm.$^2$ and still higher. Screw pumps used for circulation of the oil impart to the oil flow a pulsating agitation which is still more accentuated when using gear pumps. This pulsation results in devices of the constructions known in prior art in radial impact of the liquid fed into the device on the boring tool in such a manner as to impart to said tool a vibration transversal to its longitudinal axis which vibration, inter alia, in a disturbing manner influences the appearance of the bore.

One object of my invention is to eliminate said drawback by providing a cooling agent supplying device having means preventing the entering stream of cooling agent from impacting the boring in the radial direction.

A further object of my invention is to provide a cooling agent supplying device having said means at the same time disposed radially to guide the boring tool. A guiding of said kind is of great importance, in particular in the cutting of small deep bores in order to avoid any outward bending of the portion of the boring tool located within the supply device and subjected to the boring pressure.

Further objects and advantages of my invention will be apparent from the following description, considered in connection with the accompanying drawing which forms part of the invention and which shows a longitudinal section of a supply device constructed according to my invention for supply of cooling medium to the cutting tool of a boring machine.

The device illustrated in the drawing comprises a sleeve 10 having a cylindrical external face 12 by means of which the device is set up on a support of the boring machine or a slide displaceable on said support. With its one end the device centres and clamps the longish workpiece 14, a rifle barrel blank, for example, which preferably at its end not shown is connected with a rotatable driving part of the machine. Interposed between a casing 16 and a turned part 18 of the rotationally stationary sleeve 10 there is a suitably double-row roller bearing 20 adapted to absorb both radial and axial thrusts. The outer ring of the bearing is rigidly secured to the sleeve by means of a ring 22 and screws 24. The casing 16 is at its outer end provided with a cover 26 kept locked to the casing by means of screws 28. The cover has an annular member 30 rigidly secured thereto by means of screws 32 and has cone-shaped grooves 34 adapted to be pressed against the workpiece 14. The casing 16 with the members joined thereto is mounted rotationally relatively to the cover of the apparatus 10 as will be understood from the above description.

The sleeve 10 of the device has an axially extending channel 36 housing a bushing 38 located adjacent the clamping place for the workpiece. The bushing 38 is rigidly secured to the sleeve by means of a thread joint 40 and is sealed thereagainst by means of a packing, such as, for example, a so-called O-ring 42, i. e. a ring having a circular cross-section. The bushing 38 has an internal bore 39 extending in line with the channel 36 and suitably presenting an open diameter diminishing in the direction towards the workpiece adjacent to which said bore has a cylindrically shaped portion 44 serving as guide for the cutting head during attachment of the tool to and its first penetration into the workpiece 14. A sealing sleeve 46 is disposed around the end portion of the bushing 38 and is slidable in an axial direction. Said sleeve carries a rubber collar 48 rigidly secured thereon and provided with an inwardly bent end portion 50 adapted to become abutted by the workpiece 14. The displacement of the sleeve 46 in the outward direction is stopped by a flange 52. A sealing ring, such as O-ring 54, abuts against the outer face of the bushing. A packing 55 is intended to prevent cooling medium escaping past the sealing sleeve 46 from leaking out. The sealing member 46, 48 is devised so as to abut against the workpiece when subjected to the pressure determined by the cooling agent, which pressure, though insignificant in itself, ensures an effective sealing effect.

The boring tool which passes straight through the device and which with its rear end is secured to a bore slide not presented and advancing the tool, is supported in the interior of the device at the end facing the bore slide by means of three wedge-formed members 56 which have conical external faces 58 directed towards an annular member 60 screwed into the sleeve 10 and which are pressed against said annular member by means of threads 62. The annular member 60 is also adapted to keep a sleeve-formed tubular member 64 provided with a bore 65 to be passed by the boring tool and at its end facing the workpiece formed with a portion 66 adapted radially to guide the bore shaft. Packings such as O-rings 68 are inserted into said portion in order to prevent cooling agent from leaking out. The tubular member 64 is located in an enlargement 69 of the channel 36. The cooling agent is introduced by a pump (not shown) into the supply device through a channel 70 radially penetrating the sleeve 10 and opening, according to my invention, radially in front of the external face of the tubular member 64, the outer contour of which may conically taper in the direction towards the workpiece.

When the cooling agent or oil while subjected to high pressure enters the apparatus through the conduit 70 the inevitable pulsating agitation imparted by the pump to the stream of agent is prevented by the tubular member 64 from becoming transmitted in the radial direction to the boring tool. The boring tool is shielded against the oil stream until said stream has had time to turn and change into an axial flow. Any pulsation which the agent then may still be subjected to, has no disturbing influence on the boring tool. At the same time the member 64 by its bore 66 assists in centering the boring tool which, moreover, is radially supported by the wedge-shaped members 56 and the channel portion 44, which last mentioned support is effective only during the first step of the boring operation when the cutting head still is inside the bushing 38.

The shielding member 64 must not necessarily encase the boring tool around its total circumference.

While one more or less specific embodiment of my invention has been described, it is to be understood that this is for purpose of illustration only, and that my invention is not to be limited thereby, but its scope is to be determined by the appended claims.

What I claim is:

1. In a boring machine; a casing having a passage therethrough adapted for reciprocably receiving an elongated boring tool, means rotatably mounted on one end of the casing for clamping engagement with the end of a workpiece to be bored by the boring tool, an inlet in the casing for introducing cooling fluid substantially radially into the passage through the casing at high velocity and under high pressure, and means for preventing the said fluid from impinging directly against the boring tool, said means comprising a tapering baffle member mounted in said casing and having its larger end in sealing engagement with the casing at the side of the inlet therein opposite the workpiece and having sealing means at the smaller end adapted for sealingly engaging the boring tool between the said inlet and workpiece.

2. In a boring machine; a stationary casing, means rotatably mounted on one end of the casing for rotatably supporting one end of a workpiece, said casing having a passage therethrough for receiving a boring tool that can be moved axially through the casing and into working engagement with the end of the workpiece, a substantially radial inlet in the wall of the casing between the ends thereof for the introduction of cooling fluid into the passage at high velocity and at high pressure, and means for preventing the said fluid from impinging against the boring tool thereby to eliminate vibration of the boring tool by such impingement, said means comprising an elongated frusto-conical baffle member mounted within the passage in the casing and having its larger end in sealing engagement with the casing on the side of the inlet opposite the workpiece, said baffle member defining a flow passage of substantial size for fluid in said casing, and said baffle member tapering inwardly from its larger end toward the workpiece end of the casing and extending past the said inlet, the smaller end of said baffle member being of a size to fit relatively closely about said boring tool and having sealing means to engage the boring bar whereby the baffle member masks the boring tool from the high pressure fluid entering through said inlet.

3. A device of the nature described comprising a hollow casing, an inlet opening substantially radially through the side wall of said casing between the ends thereof, said casing being adapted for having a boring tool extend therethrough on the axis thereof, and a guide and baffle member mounted in said casing, said guide and baffle member having sealing abutting engagement with the inside of said casing on one side of said inlet and tapering inwardly from said engagement to a smaller end portion a substantial distance on the other side of said inlet, said smaller end portion being adapted for embracing the boring tool relatively closely, and there being seal means inside said smaller end adapted for sealing about the boring tool whereby cooling fluid at high velocity and high pressure can be introduced through said inlet and will be deflected by said baffle and guide member so as to be travelling substantially axially before it impinges upon the boring tool.

4. In a device of the nature described; a casing having a bore therethrough adapted for receiving a boring tool, a guide sleeve mounted in one end of the bore and sealed thereto and tapering inwardly toward the other end of the said bore and spaced from the bore so as to provide a flow passage for fluid, the smaller end of said sleeve having means for sealingly engaging about the boring tool, and an inlet in the casing adjacent the said one end thereof for the admission of cooling fluid at high velocity and under high pressure, said high pressure fluid impinging against said guide sleeve and being directed thereby in a substantially axial direction before the said fluid comes into contact with the boring tool whereby the boring tool can be supplied with high pressure high velocity cooling fluid without being deflected or vibrated in any way thereby.

References Cited in the file of this patent

UNITED STATES PATENTS

| | | |
|---|---|---|
| 2,092,101 | Wickersham et al. | Sept. 7, 1937 |
| 2,106,361 | Spurlin | Jan. 25, 1938 |
| 2,185,701 | Boyle | Jan. 2, 1940 |
| 2,552,463 | Searles | May 8, 1951 |